United States Patent
Khan et al.

(10) Patent No.: US 8,176,281 B2
(45) Date of Patent: *May 8, 2012

(54) CONTROLLING ACCESS TO AN EMBEDDED MEMORY OF A MICROCONTROLLER

(75) Inventors: Ata Khan, Saratoga, CA (US); Greg Goodhue, San Jose, CA (US); Pankaj Shrivastava, San Jose, CA (US)

(73) Assignee: NXP B.V., Eindhoven (NL)

(*) Notice: Subject to any disclaimer, the term of this patent is extended or adjusted under 35 U.S.C. 154(b) by 866 days.

This patent is subject to a terminal disclaimer.

(21) Appl. No.: 12/064,381

(22) PCT Filed: Aug. 22, 2006

(86) PCT No.: PCT/IB2006/052906
§ 371 (c)(1),
(2), (4) Date: Oct. 24, 2008

(87) PCT Pub. No.: WO2007/023458
PCT Pub. Date: Mar. 1, 2007

(65) Prior Publication Data
US 2009/0204779 A1    Aug. 13, 2009

Related U.S. Application Data

(60) Provisional application No. 60/710,647, filed on Aug. 22, 2005.

(51) Int. Cl.
*G06F 12/00* (2006.01)

(52) U.S. Cl. ......................... 711/163; 711/166

(58) Field of Classification Search .................. 711/163, 711/166
See application file for complete search history.

(56) References Cited

U.S. PATENT DOCUMENTS

| | | | |
|---|---|---|---|
| 5,774,545 A | | 6/1998 | Raghavachari |
| 6,131,174 A | * | 10/2000 | Fischer et al. ................. 714/733 |
| 6,223,305 B1 | * | 4/2001 | Simmons et al. ............... 714/34 |
| 6,321,354 B1 | * | 11/2001 | Prunier ......................... 714/726 |
| 6,769,065 B2 | | 7/2004 | Mayer |
| 6,952,750 B2 | * | 10/2005 | Cheung et al. ................ 710/305 |
| 2002/0194540 A1 | * | 12/2002 | Cheung et al. .................. 714/34 |

OTHER PUBLICATIONS

Hely, D; et al "Test Control for Secure Scan Designs" Test Symposium, 2005. European Tallin, Estonia May 22-25, 2005, IEEE, May 22, 2005, pp. 190-195.

* cited by examiner

*Primary Examiner* — Reba I Elmore

(57) ABSTRACT

A microcontroller (30) includes a processor (32), an embedded memory (46) operatively coupled to the processor (32), and a microcontroller test interface (34) operatively connected to the processor (32) and the memory (36). The microcontroller (30) responds to a reset signal to perform a reset initiation that causes an initial disabled state of the test interface (34) to be set and execution of initiation code with the processor (32). This code execution optionally establishes a further disabled state. The microcontroller (30) provides an enabled state of the test interface for memory (46) access through the test interlace (34) during microcontroller (30) operation subsequent to the reset initiation unless the further disabled memory (46) access state is established by execution of the initiation code.

26 Claims, 2 Drawing Sheets

CONTROLLING ACCESS TO AN EMBEDDED MEMORY OF A MICROCONTROLLER

The present invention relates to electronic devices, and more particularly, but not exclusively, relates to controlling access to an embedded memory of a microcontroller through JTAG ports.

Security for integrated circuits is becoming of greater interest as they are being applied in more and more security conscious applications. Some examples of such applications are smart cards, cellular telephones and other wireless communication devices, internet communication systems, and the like. It is often desirable to secure against unauthorized access to one or more portions of the integrated circuit. Unauthorized access to programming or other memory contents in such devices has become of particular concern to many application/program developers.

At the same time, there is an interest in allowing for the input and output of information to and from integrated circuits. Indeed, information Input/Output (I/O) is often desired to test, emulate, and debug a given integrated circuit. One common standard used for integrated circuit debug, emulation, and/or testing purposes is JTAG (Joint Test Action Group) IEEE (Institute of Electrical and Electronic Engineers) 1194.1 test access port and boundary scan architecture. In addition to the standard JTAG interface, there are a wide variety of other debug, emulation, and/or test interfaces used for integrated circuits. Unfortunately, input/output terminals for JTAG or other desired interfaces sometimes provide a path for unauthorized access to the integrated circuit. As a result, there often is a competing interest between the desire to secure access to integrated circuitry and the need to provide debug, emulation, and/or test capability. Thus, a demand remains for further contributions in this area of technology.

One embodiment of the present invention is a unique technique for securing access to integrated circuitry. Other embodiments of the present invention include unique devices, methods, systems, and apparatus to control access to the embedded memory of an integrated circuit.

A further embodiment comprises: establishing reset initiation operation of a microcontroller that includes an embedded memory, a programmable processor, and a test interface operatively coupled to the memory and the processor; establishing an initial disabled state of the test interface to disable access to the memory through the test interface during the initiation operation; executing an initial, or boot, programming sequence also referred to herein as reset programming stored in the memory with the processor to optionally establish a further disabled state of the test interface during the initial disabled state; and enabling memory access through the test interface for microcontroller operation after the initiation operation unless the further disabled state is established by execution of the reset programming. The further disabled state denies memory access through the test interface during microcontroller operation subsequent to the initiation operation. In one form, the further disabled state is established by the reset programming and/or the initial disabled state is performed in accordance with operating logic in response to a reset signal.

Another embodiment comprises: resetting a microcontroller including an embedded memory, a programmable processor, and a test interface operatively coupled to the memory and the processor; in response to the resetting, executing reset initiation code stored in the memory that disables memory access through the test interface to protect memory contents during microcontroller operation subsequent to the resetting; and during the microcontroller operation subsequent to the resetting, changing the contents of the memory to enable access to the memory through the test interface. In one form, the changing includes at least one of: erasing the memory and storing different contents in the memory, and the reset initiation code is stored in a predefined portion of the memory and the memory is nonvolatile. Alternatively or additionally, this embodiment includes providing an initial disabled state of the test interface in response to the resetting before completing execution of the reset initiation code and establishing a further disabled state of the test interface through the execution of the reset initiation code, in which the initial disabled state is set in response to operating logic of the microcontroller and/or by the execution of the reset initiation code.

Still another embodiment includes: a microcontroller integrated circuit with a processor, an embedded memory operatively coupled to the processor, and a microcontroller test interface operatively connected to the processor and the memory. The microcontroller responds to a reset signal to perform a reset initiation that sets an initial disabled state of the test interface and executes initiation code with the processor during the reset disabled state to optionally establish a further disabled memory access state. The initial disabled state prevents access to the memory through the test interface. The microcontroller provides an enabled state for memory access through the test interface during microcontroller operation subsequent to the reset initiation unless the further disabled memory access state is established by execution of the initiation code.

Yet another embodiment of the present invention comprises: resetting a microcontroller including an embedded memory and a programmable processor, and a test interface operatively coupled to the memory and the processor; executing initiation code stored in the memory; in response to the resetting; establishing an initial disabled state of the test interface to protect contents of the memory from access through the test interface and optionally establishing a further disabled state of the test interface during the executing; and after the executing, establishing an enabled state of the test interface that permits access to the contents of the memory through the test interface during subsequent microcontroller operation unless the further disabled state is established by execution of the initiation code.

One object of the present invention is to provide a unique technique for securing access to integrated circuitry.

Another object of the present invention is to provide a unique device, method, system, or apparatus to control access to the contents of an embedded memory of an integrated circuit.

Further objects, embodiments, forms, features, benefits, and advantages of the present invention shall become apparent from the description and figures included herewith.

Figure 1:
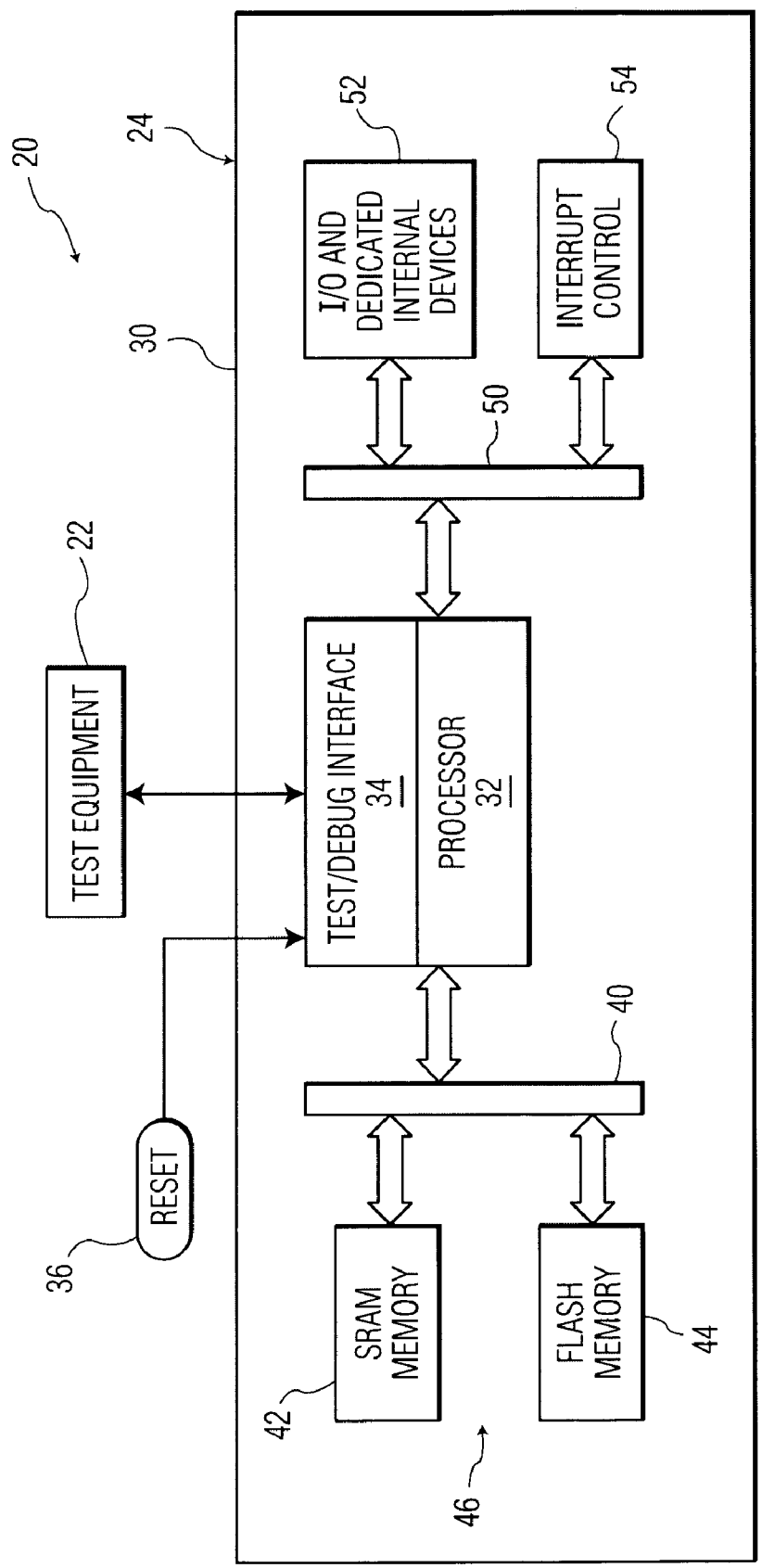
FIG. 1 is a diagrammatic view of an integrated circuit system including a microcontroller coupled to test equipment.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present invention comprises a microcontroller integrated circuit that includes a processor, an embedded memory operatively coupled to the processor, and a microcontroller test interface operatively connected to the processor and the memory. The microcontroller responds to a reset signal to perform a reset initiation that includes setting a reset disabled state of the test interface and optionally establishing a further disabled state of the test interface. The microcontroller provides an enabled state of the test interface for memory access through the test interface during subsequent operation unless the further disabled state is established by execution of reset initiation code beforehand.

FIG. 1 depicts another embodiment in the form of integrated circuit system 20. System 20 includes test equipment 22 operatively coupled to integrated circuit 24. Integrated circuit 24 is structured to provide microcontroller 30. Microcontroller 30 includes processor 32 and test interface 34. As used herein, "test interface" broadly refers to any integrated circuit interface arranged to provide testing, debugging, emulation, or a combination of these in accordance with one or more established protocols. A given test interface may be accessible through dedicated terminals or may be accessed through terminals shared with one or more other interfaces, devices, or the like of the corresponding integrated circuitry. In one embodiment, interface 34 conforms to the JTAG standard. Alternatively or additionally, a different test interface protocol can be utilized. Philips Semiconductors model LPC2114 and model LPC2124 are nonlimiting examples of microcontroller devices with JTAG and emulation trace port capabilities.

A binary reset input 36 to microcontroller 30 is also shown in FIG. 1. A corresponding reset signal resets operation of microcontroller 30, prompting certain defaults and directing program execution that starts at a predefined boot-up memory location. In response to a reset condition, microcontroller 32 performs a reset initialization as further described hereinafter in connection with FIG. 2. This initialization may be implemented in programming instructions, hardware, or a combination of both.

Processor 32 is further coupled to local bus 40 to provide bidirectional access to embedded Static Random Access Memory (SRAM) memory 42 and embedded nonvolatile flash memory 44. Bus 40 may be coupled to SRAM memory 42 and/or flash memory 44 via memory control logic (not shown) or the like. Memory 44 is typically used to store programming instructions that are executed by processor 32 during microcontroller operation. Memory 44 is structured to be programmed via one or more input ports (such as a serial communication port), and is responsive to a bulk erase command to erase its contents. Erasure of memory 44 can be in response to an external signal, an internal signal, or both in various embodiments. SRAM 42 is provided for data and code storage as desired. Collectively, SRAM 42 and memory 44 comprise embedded microcontroller memory 46.

Microcontroller 30 includes various input devices, output devices, Input/Output (I/O) devices, and/or various different dedicated internal devices that are collectively designated by reference numeral 52. High speed internal bus 50 is coupled to processor 32 and devices 52 to provide selective bidirectional communication therebetween. In one particular form, devices 52 are coupled to bus 50 via an interface bridge (not shown). Devices 52 can include one or more timers, real-time clocks, analog-to-digital (A/D) converters, digital-to-analog (D/A) converters, general purpose I/O pins (GPIO), Universal Asynchronous Receiver/Transmitter (UART) interfacing and/or various other serial communication ports, external interrupt pathways, pulse-width modulation outputs, or the like. Also coupled to bus 50 is interrupt control logic 54. Interrupt control logic 54 manages internal and external interrupts associated with microcontroller 30.

Test equipment 22 is of a type configured to provide appropriate testing, debugging, and/or emulation via interface 34 of microcontroller 30. For example, for a JTAG form of interface 34, test equipment 22 can be any of a number of standard types of JTAG devices. It should be appreciated that while access to microcontroller 30 via test equipment 22 often is desired during initial manufacture, testing, and development; unauthorized access to data stored in memory 42 and/or 44 (such as programming) is often of concern once the programmed part is being provided in a product to the relevant consumer. Indeed, there is often a desire to take measures to prevent a competitor from reading or otherwise gaining access to programming of such parts. Accordingly, microcontroller 30 is structured with suitable operating logic upon reset to provide the program developer the option of whether to disable access to memory or not. Because this option is exercised through user-defined programming, disabling test interface access to memory need not be implemented until after any desired testing/debugging/emulation has been performed to the satisfaction of the manufacturer and/or supplier of the unprogrammed part.

Figure 2:
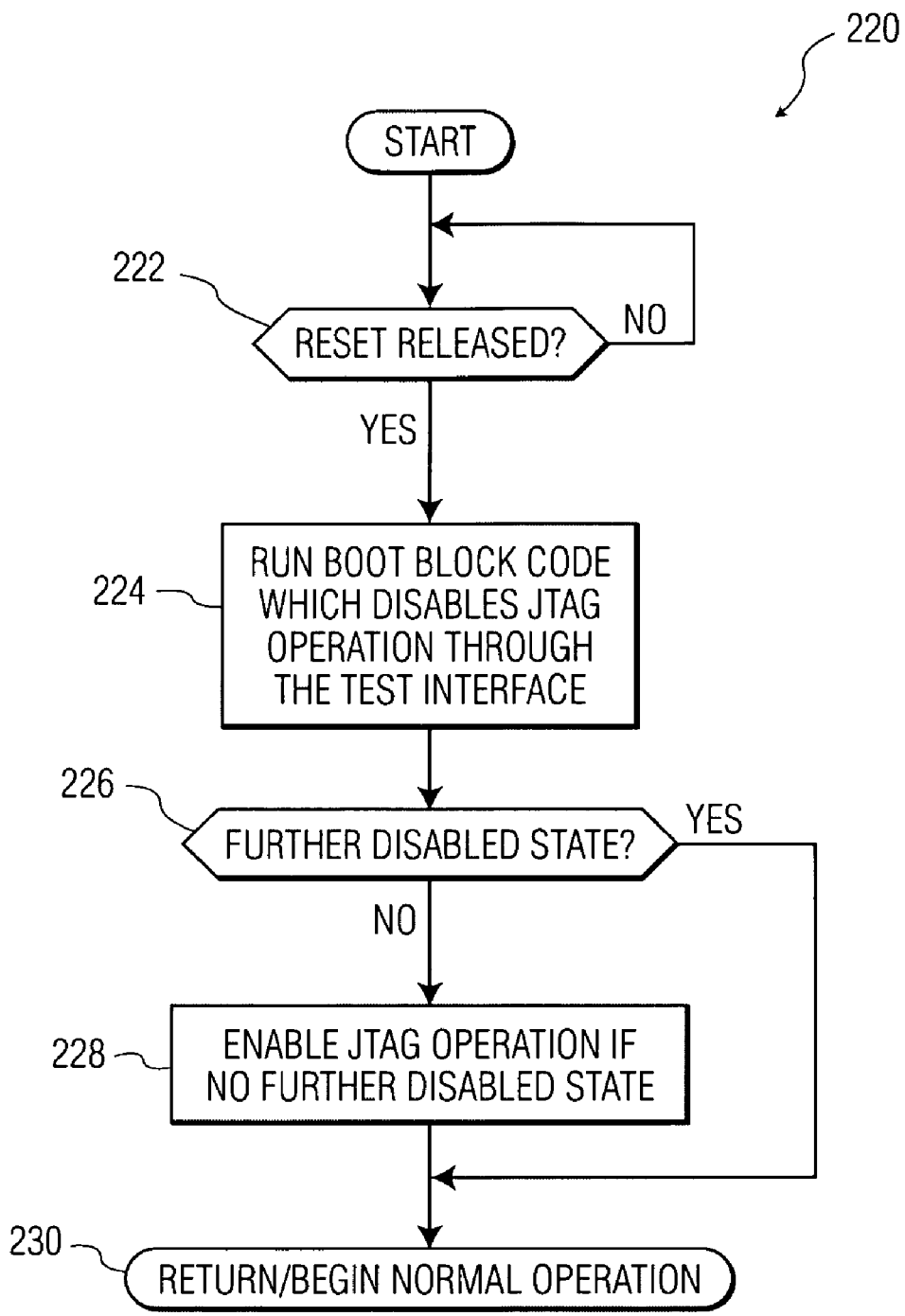
FIG. 2 is a flowchart of one procedure that can be performed with the system of FIG. 1.

One nonlimiting embodiment for optionally disabling test interface 34 of microcontroller 30 is described in connection with procedure 220 illustrated in the flowchart of FIG. 2. For this particular implementation, test interface 34 conforms to a JTAG protocol; however it should be appreciated that a different protocol may alternatively or additionally be applicable in other embodiments. At least some of the operations referenced in connection with procedure 220 are performed through dedicated operating logic of microcontroller 30, which may be provided in the form of dedicated hardware, in the form of hardwired microcontroller instructions, in the form of alterable, memory-stored microcontroller instructions, and/or in a different form as would occur to those skilled in the art.

Procedure 220 begins with conditional 222, which tests whether a binary logical reset signal previously set to a logical active state via a change of state at reset input 36 has been released—that is whether the reset signal has returned to its inactive state. By way of nonlimiting example, a reset signal may result from a power-down/power-on cycle (Power-On Reset—POR) or a power source voltage drop below a predefined threshold as may occur during a brown-out condition (Brown-Out Reset—BOR).

If the test of conditional 222 is negative (false), then procedure 220 loops back, repeating conditional 222 until the corresponding test outcome is affirmative. Once the test of conditional 222 is affirmative (true), procedure 220 continues with operation 224. In operation 224, processor 32 vectors to a reserved reset initiation location in memory 44. If an optional "boot block" of reset programming (initiation code) has been previously stored relative to this location, its execution begins in operation 224 with processor 32. This reset programming is stored as a "block" of contiguous memory locations corresponding to a specified memory address range for the depicted embodiment. Alternatively, the code can be stored in noncontiguous locations of a reserved or unreserved type within memory 42 and/or memory 44. By way of nonlimiting example, the reset initiation location can point to at least a portion of the reset routine through indirect addressing or the like. The reset initiation programming is typically specified by the Original Equipment Manufacturer (OEM), of the microcontroller 30.

Through the boot block code execution in operation 224, an initially disabled state of test interface 34 is set. During this initial disabled state, the utilization of JTAG functionality of test interface 34 to control microcontroller 30 is prevented, which includes denying access to memory 42 or memory 44 via test interface 34. Accordingly, unauthorized access through test interface 34 via a reset signal change of state is prevented by setting a test interface disabled state with the start of execution of the initiation code.

While the initial disabled state of the test interface persists, execution of the reset programming (boot block) continues, and optionally includes the establishment of a further disabled state of the test interface. Conditional 226 tests whether execution of the boot block code (when present) has found a user security request corresponding to the setting of a further disabled state during operation 224 after such execution has being completed. The setting of this further disabled state of test interface 34 is an option defined by the application programming code developer. Typically, development of the application programming is for a given product application of microcontroller 30 and is being performed by a party other than an Original Equipment Manufacturer (OEM) of the microcontroller component. As the reset programming is executing, this optional further disabled state can be set through any of a number of techniques, such as an external signal input, contents of a specified memory location, a checksum of the content of several memory locations, or other operation/function that is acceptably secure.

If the test of conditional 226 is negative (false)—that is the further disabled state is not set, then procedure 220 continues with operation 228. In operation 228, JTAG operation of test interface 34 is enabled, discontinuing the initially disabled state set by the boot block code. Correspondingly, JTAG control, including access to memory 42 and memory 44 is permitted in operation 228 for subsequent microcontroller operations as represented by the return/beginning of normal microcontroller operation in stage 230.

On the other hand, if the test of conditional 226 is affirmative (true)—that is the further disabled state of test interface 34 is set by the reset programming—then procedure 220 bypasses operation 228. As a result, the disabled status of test interface 34, provided in response to the initially disabled state set by the reset programming is maintained because the enabled state is not provided via performance of operation 228. Instead, procedure 220 goes from conditional 226 directly to microcontroller operation subsequent to the reset processing condition as represented by stage 230. Stage 230 corresponds to the subsequent nominal operation of microcontroller 30 with test interface 34 blocked.

The establishment of a disabled or enabled state of test interface 34 and/or memory access of the types previously described can be performed by taking action to impose a change that causes a given state to be set, or allowing a state to persist or change by omission of a given corresponding action. It should be appreciated that the features of procedure 220 include disabling access through interface 34 upon reset to prevent unauthorized assertion of control through interface 34 during a reset condition. Further, in the absence of the optional reset programming, it should be understood that enablement of interface 34 occurs by default. Accordingly, control and/or access to microcontroller 30 can be gained through JTAG operations via interface 34 during manufacture, testing, and development as long as reset programming is absent or does not establish the further disabled state if such programming is present.

On rare occasion, it may be desirable to perform internal testing, debugging, emulation, or the like of an earlier programmed microcontroller 30 for which the further disabled state has already been set to nominally prevent access via interface 34. For example, a failure analysis may be desired of one or more programmed microcontrollers 30 that have been returned to the OEM supplier by the product/code developer. In such a case, access via interface 34 can be re-established by altering the memory contents being protected through the further disabled state of interface 34. In one nonlimiting example, this alteration is accomplished by a bulk erase command or input signal that destroys the contents of the memory locations, thus continuing protection of such contents from unauthorized access. Alternatively or additionally, this alteration can be implemented by rewriting at least a portion of the stored reset initiation code and/or any memory location referenced to set the further disabled state of the test interface 34 during operation 224. In one instance, a serial communication device included in devices 52 provides a write-only access to memory 42 and memory 44 through which such alteration can occur. In this manner, the contents of memory 42 and memory 44 can be protected at the option of the programmer, until such time (if any), that testing and debugging of the device is further required; and even then protection continues because the alteration needed to enable test interface access simultaneously changes the content being protected.

While some of the operations and conditionals of procedure 220 are implemented through the reset programming, it should be appreciated that in other embodiments, one or more of these operations can be performed through dedicated operating logic specific to microcontroller 30. By way of nonlimiting example, the initial disabled state of test interface 34 could alternatively or additionally be established by dedicated hardware or microcontroller instructions that are not nominally user-defined (such as firmware).

Many other embodiments of the present application are envisioned. For example, the teachings of the present application can be applied in other types of integrated circuits besides microcontrollers. Alternatively or additionally, other types of memory access control can be utilized and/or other types of memory protected. Another example includes a microcontroller with an embedded memory, a programmable processor, and a test interface operatively coupled to the memory and the processor. The microcontroller comprises means for establishing an initial disabled state of the test interface to disable access to the memory through the test interface during a reset initiation operation; means for executing reset programming stored in the memory with the processor to optionally establish a further disabled state of the test interface during the initial disabled state; and means for enabling memory access through the test interface for microcontroller operation after the initiation operation unless the further disabled state is established by execution of the reset programming. This further disabled state disables the memory access through the test interface during the microcontroller operation after the initiation operation. In one form, the initial disabled state is established by the reset programming and/or by dedicated microcontroller operating logic.

Still another example comprises: a microcontroller with an embedded memory, a programmable processor, and a test interface operatively coupled to the memory and the processor. The microcontroller includes means of executing reset initiation code stored in the memory with the processor that disables access to the memory through the test interface to protect memory contents during microcontroller operation subsequent to the resetting and means for changing the contents of the memory to enable access to the memory through the test interface during the microcontroller operation subsequent to the resetting. In one form, the means for changing includes at least one of: means for erasing the memory and means for storing different contents in the memory. Alternatively or additionally, the microcontroller includes means for providing an initial disabled state of the test interface in response to the resetting before completing execution of the reset initiation code and means establishing a further disabled state of the test interface through the execution of the reset initiation code, in which the initial disabled state is set in response to operating logic of the microcontroller and/or by the execution of the reset initiation code.

A further embodiment includes a microcontroller comprising an embedded memory, a programmable processor, and a test interface operatively coupled to the memory and the processor. The microcontroller includes means for executing initiation code stored in the memory in response to resetting the microcontroller; means for establishing a first disabled state of the test interface to protect contents of the memory from access through the test interface and optionally establishing a second disabled state of the test interface during the execution of the initiation code; and means for establishing an enabled state of the test interface that enables access to the contents of the memory through the test interface during subsequent microcontroller operation unless the second disabled state is established by execution of the initiation code.

Any theory, mechanism of operation, proof, or finding stated herein is meant to further enhance understanding of the present invention, and is not intended to limit the present invention in any way to such theory, mechanism of operation, proof, or finding. While the invention has been illustrated and described in detail in the drawings and foregoing description, the same is to be considered as illustrative and not restrictive in character, it being understood that only selected embodiments have been shown and described and that all equivalents, changes, and modifications that come within the spirit of the inventions as defined herein or by the following claims are desired to be protected.

What is claimed is:

1. A method, comprising:
    establishing reset initiation operation of a microcontroller, the microcontroller including an embedded memory, programmable processor, and a test interface operatively coupled to the memory and the processor;
    during the reset initiation operation of the microcontroller, establishing a first disabled state of the test interface to disable access to the memory through the test interface;
    executing reset programming stored in the memory with the processor to optionally establish a second disabled state of the test interface during the first disabled state; and
    enabling memory access through the test interface for microcontroller operation after the reset initiation operation unless the second disabled state is established by execution of the reset programming, the second disabled state disabling the memory access through the test interface during the microcontroller operation after the reset initiation operation.

2. The method of claim 1, wherein the first disabled state is established by the reset programming.

3. The method of claim 1, which includes inhibiting the enabling of the memory access in response to optional establishment of the second disabled state through the execution of the reset programming.

4. The method of claim 3, which includes altering contents of the memory during the microcontroller operation after the reset initiation operation to gain memory access through the test interface.

5. The method of claim 4, wherein the altering includes at least one of erasing the memory and storing different contents in the memory through an external memory port.

6. The method of claim 1, wherein the establishing of the first disabled state is performed in accordance with operating logic in response to a reset signal.

7. The method of claim 1, wherein the test interlace is operable to perform JTAG operations when enabled.

8. A method, comprising:
    resetting a microcontroller including an embedded memory, a programmable processor, and a test interface operatively coupled to the memory and the processor;
    in response to the resetting, executing reset initiation code stored in the memory with the processor, the initiation code disabling access to the memory through the test interface to protect memory contents during microcontroller operation subsequent to the resetting; and
    during the microcontroller operation subsequent to the resetting, changing the contents of the memory to enable access to the memory through the test interface.

9. The method of claim 8, wherein the disabling access includes establishing an initial disabled stated of the test interface and a further disabled state of the test interlace with the initiation code, the initial disabled state denying access during reset processing and the further disabled state inhibiting enabling of memory access through the test interface during the microcontroller operation subsequent to the resetting to prevent the contents of the memory from being read through the test interface.

10. The method of claim 8, wherein the changing of the contents of the memory during the microcontroller operation subsequent to the resetting includes erasing at least a portion of the contents of the memory to gain memory access through the test interlace.

11. The method of claim 8, wherein the changing of the contents of the memory during the microcontroller operation subsequent to the resetting includes storing different contents in at least a portion of the memory to gain memory access through the test interface.

12. The method of claim 8, wherein:
    the changing includes at least one of: erasing the memory and storing different contents in the memory; and
    the reset initiation code is stored in a predefined portion of the memory and the memory is nonvolatile.

13. The method of claim 8, which includes providing a first disabled state of the test interface in response to the resetting before completing execution of the reset initiation code and establishing a second disabled state of the test interface through the execution of the reset initiation code.

14. The method of claim 8, wherein the first disabled state is set in response to operating logic of the microcontroller.

15. Apparatus, comprising: a microcontroller integrated circuit including a processor, an embedded memory, and a microcontroller test interface operatively connected to the processor and the memory, the microcontroller being responsive to a reset signal to perform a reset initiation, the reset initiation being operable to set an initial disabled state to memory access through the test interface and execute initiation code with the processor during the initial disabled state to optionally establish a further disabled state for the memory access through the test interface, the microcontroller providing an enabled state for access to the memory through the test interface during microcontroller operation subsequent to the reset initiation unless the further disabled state is established by execution of the initiation code.

16. The apparatus of claim 15, wherein the microcontroller includes means for performing input and output operations through the test interface with external equipment in accordance with a JTAG protocol.

17. The apparatus of claim 15, wherein the microcontroller is responsive to one or more signals to alter contents of the memory after the further disabled state is set to change contents of the memory and enable memory access through the test interlace.

18. The apparatus of claim 15, wherein the microcontroller includes means for changing contents of the memory after the further disabled state is set by the execution of the initiation code.

19. The apparatus of claim 15, wherein the memory is of a nonvolatile flash type and the initiation code is stored in the memory relative to at least one reserved memory location.

20. The apparatus of claim 15, wherein the initiation code is executable to set the initial disabled state of the test interface.

21. The apparatus of claim 15, wherein the microcontroller is structured to set the initial disabled state in response to the reset initiation before execution of the initiation code commences.

22. A method, comprising:
resetting a microcontroller including an embedded memory, a programmable processor, and a test interface operatively coupled to the memory and the processor;
in response to the resetting, executing initiation code stored in the memory;
during the executing, establishing an initial disabled state of the test interface to protect contents of the memory from access through the test interface and optionally establishing a further disabled state of the test interface; and
after the executing, establishing an enabled state of the test interface that enables access to the contents of the memory through the test interface during subsequent microcontroller operation unless the further disabled state is established by execution of the initiation code.

23. The method of claim 22, which includes inhibiting the enabling of the memory access in response to optional establishment of the further disabled state through the execution of the reset programming.

24. The method of claim 23, which includes altering contents of the memory during the microcontroller operation after the resetting to gain memory access through the test interface.

25. The method of claim 24, wherein the altering includes at least one of erasing the memory and storing different contents in the memory through an external memory port.

26. The method of claim 24, wherein the test interface is operable to perform JTAG operations when enabled, the memory is of a nonvolatile type, and the initiation code is stored in the memory relative to one or more predefined memory locations.

* * * * *